(12) United States Patent
Bordelon et al.

(10) Patent No.: US 10,419,882 B2
(45) Date of Patent: Sep. 17, 2019

(54) AUTONOMOUS TRACKING OF CONSTRUCTION VEHICLES USING SHORT RANGE WIRELESS BEACONS

(71) Applicant: Heavy Construction Systems Specialists, Incorporated, Sugar Land, TX (US)

(72) Inventors: Michael Bordelon, Sugar Land, TX (US); Joshua Owen McDonald, Houston, TX (US)

(73) Assignee: Heavy Construction Systems Specialists, Inc., Sugar Land, TX (US)

( * ) Notice: Subject to any disclaimer, the term of this patent is extended or adjusted under 35 U.S.C. 154(b) by 0 days.

(21) Appl. No.: 15/985,419

(22) Filed: May 21, 2018

(65) Prior Publication Data

US 2019/0182620 A1    Jun. 13, 2019

Related U.S. Application Data

(60) Provisional application No. 62/597,311, filed on Dec. 11, 2017.

(51) Int. Cl.
*H04W 4/02* (2018.01)
*H04W 4/80* (2018.01)
*G01S 11/06* (2006.01)

(52) U.S. Cl.
CPC ............ *H04W 4/025* (2013.01); *G01S 11/06* (2013.01); *H04W 4/80* (2018.02)

(58) Field of Classification Search
CPC .......... H04W 4/025; H04W 4/80; G01S 11/06
See application file for complete search history.

(56) References Cited

U.S. PATENT DOCUMENTS

| 9,264,874 | B2 | 2/2016 | Fraccaroli | |
|---|---|---|---|---|
| 2008/0045274 | A1* | 2/2008 | Witkowski | G07C 5/008 |
| | | | | 455/569.2 |
| 2008/0084324 | A1* | 4/2008 | Wallace | G06Q 10/06 |
| | | | | 340/679 |
| 2015/0094097 | A1 | 4/2015 | Fraccaroli | |
| 2016/0295356 | A1* | 10/2016 | Schoner | G06K 7/10366 |
| 2017/0308817 | A1* | 10/2017 | Miller | G06Q 10/02 |
| 2018/0103350 | A1* | 4/2018 | Liao | H04W 4/90 |

OTHER PUBLICATIONS

"Bluetooth Low Energy", Wikipedia article, retrieved from uniform resource locator (URL) address https://en.wikipedia.org/wiki/Bluetooth_Low_Energy on Oct. 19, 2018.
"Near Field Communication", Wikipedia article, retrieved from uniform resource locator (URL) address https://en.wikipedia.org/wiki/Near-field_communication#Bluetooth_comparison on Oct. 19, 2018.

* cited by examiner

Primary Examiner — Joseph E Dean, Jr.
(74) Attorney, Agent, or Firm — The Courtney Firm; Mark E. Courtney

(57) ABSTRACT

Described examples include a system for tracking a construction vehicle at a construction site. The system includes a Bluetooth receiver located at the construction site for receiving a unique identifier code transmitted by a Bluetooth beacon mounted on a construction vehicle, and the Bluetooth receiver is further configured to communicate the unique identifier code to a remote computer over a communications interface.

20 Claims, 7 Drawing Sheets

AUTONOMOUS TRACKING OF CONSTRUCTION VEHICLES USING SHORT RANGE WIRELESS BEACONS

RELATED APPLICATIONS

This disclosure claims the benefit of priority to U.S. Provisional Patent Application No. 62/597311, filed Dec. 11, 2017, titled "AUTONOMOUS TRACKING OF CONSTRUCTION VEHICLES USING SHORT RANGE WIRELESS BEACONS" which application is hereby incorporated by reference herein in its entirety.

TECHNICAL FIELD

This disclosure relates generally to tracking of construction vehicles, and more particularly, to tracking of construction vehicles at construction job sites, at dumps and waste disposal sites, and at construction supply sites.

BACKGROUND

Construction companies struggle to track all of the trucking loads performed by both owned and outsourced construction vehicles. As used herein the term "construction vehicle" includes vehicles commonly used in construction and demolition work, including as example: tractor-trailer combinations; semitrailers; dedicated haulers for carrying heavy equipment; gooseneck, closed and flatbed trailers towed by a tractor or truck; panel trucks, vans and vehicles configured to haul construction materials and supplies; cranes, dump trucks, cement or asphalt mixers, excavators, pavers, graders and other road legal construction equipment and truck-trailer combinations for transporting construction equipment. Existing tracking tools for construction vehicles are too cumbersome or expensive to be practical. Tracking of construction vehicles at construction sites is critical to managing costs and staging of supplies for the construction project at the site.

Paper logging systems require human monitoring of the construction vehicle traffic at a job site, and written entry of construction vehicle identification, load or equipment carried, arrival time, and departure time by construction site personnel. The paper log is not available to a central process such as a programmable computer database, unless the data from the paper log is entered by manual data entry. Even if the data is entered into an automated system for use, the data is not available until the paper log is collected and the data is entered. The information about construction vehicle activity is not available at the time the work is performed, and can only be accessed at a later time. Paper logs can be lost and human errors in data entry, or lack of data entry if a construction vehicle arrives when the site is not manned, can create inaccuracies.

Construction vehicles have been equipped with on-board tracking devices. A dedicated global positioning system (GPS) transmitter can be mounted within a construction vehicle. GPS transmitters include those that plug into the on-board diagnostic (OBD-II) port of a vehicle, and also include other dedicated GPS systems. The GPS system is expensive and requires a permanent installation in the construction vehicle. To use the GPS equipment, a monthly subscription with a GPS service provider is required. While the GPS system can indicate the location of the construction vehicle, the equipment installation and subscription costs make use of the GPS system costly. Alternative tracking systems, including dedicated radio frequency vehicle tracking hardware and cellular tracking systems, are similarly costly.

In a construction project, construction vehicles such as trucks or tractor trailers are used to transport materials such as asphalt, rebar, concrete, sheetrock, paint, steel, stone, gravel, brick, lumber and other materials needed to perform the construction are often leased. Installation of a permanent GPS transceiver is not practical for leased trucks, because the owner of the construction project does not own the truck, and the installation and later removal of a GPS transceiver is not feasible for trucks used only temporarily. Cellular network tracking systems and dedicated radio tracking systems for vehicles have similar limitations.

SUMMARY

In accordance with an example, a construction vehicle tracking system includes a Bluetooth beacon mounted on a construction vehicle. A Bluetooth receiver at a construction site detects the presence of the construction vehicle as it receives a unique identifier code from the Bluetooth beacon. The receiver receives a unique identifier code when the construction vehicle is in range of the receiver, thus when the unique identification code is received, the location of the construction vehicle at a particular job site or area within a job site is indicated as at or as near the receiver. In an example, the Bluetooth receiver transmits the received unique identifier to a host application running on a remote computer using a data communication network. The host application takes an action in response to the unique identifier. In another example, the receiver is an autonomous Bluetooth receiver located at a job site. In an alternative example, the receiver is a Bluetooth enabled user equipment located at the job site. In a further example, the user equipment receives the unique identifier code from the Bluetooth beacon and an alert to a user is displayed. The user can take actions and additional data can be associated with the construction vehicle record. The construction vehicle record can be transmitted to a host application running on the remote computer using a communications network.

DETAILED DESCRIPTION

Corresponding numerals and symbols in the different figures generally refer to corresponding parts unless otherwise indicated. The figures are not necessarily drawn to scale. The term "coupled" herein includes elements directly connected and connected by connections including intervening elements, and such elements connected with intervening elements are also "coupled."

Figure 1:
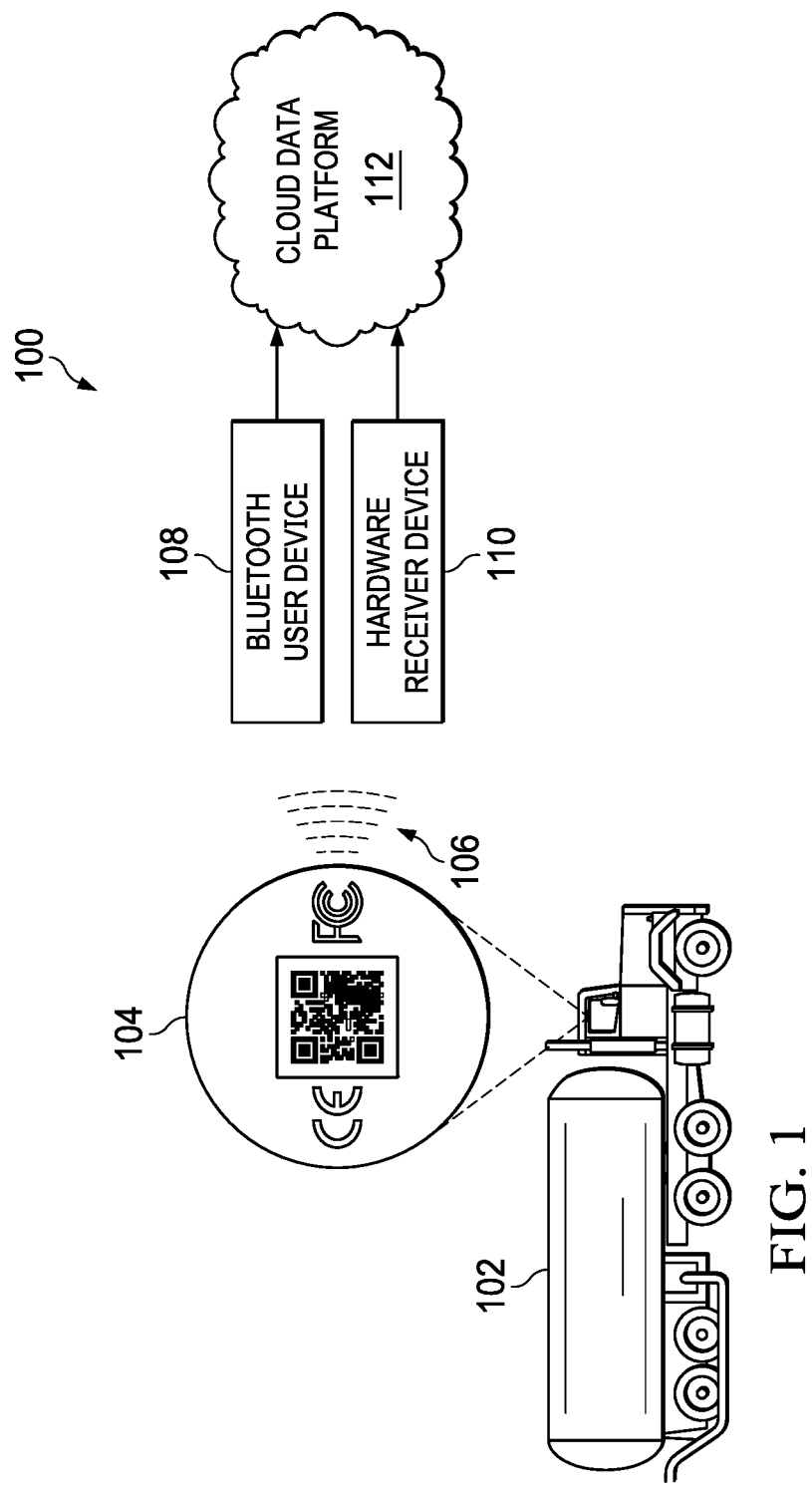
FIG. 1 is a block diagram of an example arrangement using a Bluetooth beacon for autonomous tracking of a construction vehicle.

FIG. 1 is a block diagram of an example arrangement using autonomous tracking of a construction vehicle. In FIG. 1, a truck 102 is the construction vehicle being tracked. In construction work a construction vehicle such as truck 102 can carry materials, such as bulk materials including asphalt, rebar, steel, metal, lumber, gravel, insulation, roofing materials, as examples, or can carry construction equipment such as cranes, bulldozers, graders, bobcats, and fork lifts, for example. The truck 102 can also be used to carry scrap or waste material from a job site to a dump site. Construction vehicles can include vehicles towing trailers, vehicles for hauling material, vehicles for hauling equipment, and road legal equipment such as cranes, graders, pavers, excavators, front end loaders, tractors and mixers.

In FIG. 1, a Bluetooth beacon 104 is shown. Bluetooth is a standardized wireless over-the-air communication technology providing short range low-power connectivity between devices. Bluetooth operates in frequencies between 2.402 and 2.480 GHz in the Industrial, Scientific and Medical (ISM) 2.4 GHz short-range radio band. In a consumer electronics setting, Bluetooth is commonly used to stream audio between a device and a speaker, for example. Bluetooth low energy (LE or BLE) is a Bluetooth protocol that enables short burst wireless communications over a Bluetooth interface. In BLE, a "broadcast" protocol is supported that enables Bluetooth beacons. As used herein, a "Bluetooth beacon" is a transmit-only device that repeatedly transmits a unique identifier code at intervals. Bluetooth beacons can be, in a convenient form factor, a "button" or "dot" or "tile" device that is powered by a simple coin style watch battery. Other form factors can be used and other battery types can be used in alternative Bluetooth beacons that are useful in the arrangements. Bluetooth beacons can be in a housing or package with various batteries, for mounting to a surface, a housing can be waterproof for outdoor use. In addition, Bluetooth beacons can be provided as USB or mini-USB devices that can be powered by any USB charger or adapter. Bluetooth beacons can also be provided as USB "dongles" or "fobs." In an example, the Bluetooth beacon 104 can be an iBeacon device. An iBeacon device is a Bluetooth beacon that performs a standard Bluetooth transmitter protocol introduced by Apple Corporation in 2013. iBeacon transmitters use a BLE standard compliant signaling protocol to constantly or repeatedly transmit a unique identifier code. The iBeacon transmitter can be used for proximity detection. When a Bluetooth enabled receiver is within a relatively close range to the iBeacon, the receiver detects the universally unique identifier (UUID) transmitted, and thus the physical location of the receiver easily indicates, with a known precision, the approximate location of the Bluetooth beacon. Using signal strength information the receiver can also determine a more precise location of the beacon. In a standard power configuration the range of the Bluetooth beacon is approximately 70 meters. The beacon transmit power can be adjusted to increase or decrease the range, and in an extended range mode, the range can be about 400 meters. Various manufacturers provide Bluetooth beacons including the iBeacon devices from Apple and Eddystone beacon devices from Google. Various user devices that are Bluetooth low energy enabled and which can receive the Bluetooth beacon transmissions include: certain smartphones using the iOS and Android operating systems; certain tablet computers; certain laptop computers; and other Bluetooth receiver equipped devices. A USB Bluetooth receiver dongle can be added to certain computers or phones to add Bluetooth receiver capability to a system that previously was without such capability.

A Bluetooth beacon repeatedly transmits a packet of bytes in a predetermined manner to insure interoperability with Bluetooth enabled receivers. A preamble is followed by the UUID and some additional fields. When an organization orders beacons from a beacon manufacturer, the buyer may also request the UUID be programmed to a known value for all of the ordered beacons. Alternatively, the UUID may be set after purchase using a beacon configuration application provided by the manufacturer, running on a smartphone or other Bluetooth enabled device. In addition, the beacon frame includes two user definable fields, a "major" and a "minor" code. There is no requirement that these fields be set or used, but these fields enable further unique personalization of a signal transmitted by a Bluetooth beacon. These unsigned integer values may range from 0-65536 and are also set by the user configuring the beacon. In an arrangement using these fields in a construction vehicle tracking application, each Bluetooth beacon can be uniquely associated with a particular construction vehicle, and a new beacon placed in a construction vehicle to be tracked can be quickly configured using a smartphone or tablet in the field. Later, the beacon can be removed, or can be reconfigured for a different use by changing the UUID in the beacon that is associated with the construction vehicle.

In FIG. 1, a beacon transmission is shown as an over-the-air transmission 106. The Bluetooth beacon 104 is a transmit-only device, that is, no signal back to the Bluetooth beacon is used in the standard protocols for beacons and the Bluetooth beacon is not required to act a receiver. Because the Bluetooth beacon is a low energy Bluetooth transmitter with simple circuitry, a battery in the beacon can last several years. The beacon transmits the unique identifier repeatedly. In an example, the transmission repeats at 350 millisecond intervals. The user can configure some Bluetooth beacons to vary this interval, a longer transmit interval can extend battery life of the beacon. As the beacon and the construction vehicle carrying the beacon come within reception range of a Bluetooth receiver, the receiver can receive the unique identifier from the Bluetooth signals. For example, a receiver can be located near an entrance to a job site. When the unique identifier code from a beacon within a construction vehicle (here truck 102 in FIG. 1) is correctly received, the construction vehicle location is known to be within the range of the receiver. This can be approximately 70 meters, for example. In examples, this information is sufficient to locate the construction vehicle at a job site or at a location within a job site, without the need for further proximity calculations. However, in additional examples, the Bluetooth receiver can use signal strength information to perform a proximity detection with increased precision to further locate the beacon.

In FIG. 1, a first Bluetooth receiver 108 is shown as a Bluetooth user device. Example Bluetooth user devices include Bluetooth equipped smartphones, Bluetooth equipped tablets, Bluetooth equipped computers including desktop, notebook and laptop computers, and Bluetooth equipped personal digital assistant devices such as web appliances. Dongles or USB accessories can be used to add a Bluetooth receiver to a smartphone, tablet, laptop or other computer that is not otherwise Bluetooth equipped. The Bluetooth receiver 108 enables a user to interact with the user device, for example by using applications (Apps) or other software programs executing on the user device. The Bluetooth user device can include a display, and an input capability, for example, a keyboard, touch screen, mouse, pointer, stylus or a voice recognition capability to receive user commands and data as inputs.

In FIG. 1, a second Bluetooth receiver 110 is shown as a Hardware Receiver Device. The Hardware Receiver Device 110 receives the unique identifier from Bluetooth beacon 104, but in an example it does not incorporate a user interface. Instead, the Hardware Receiver Device 110 is configured to transmit the universally unique identifier (UUID) received from the Bluetooth beacon 104 and additional selected information, such as a location identifier for the device 110 or for the job site, a date or time stamp or both, to a central processing application such as the Cloud Data Platform 112. The Bluetooth receiver 108 is a user device that is also configured to transmit the universally unique identifier received from Bluetooth beacon 104 to the Cloud Data Platform 112. Programs can be executed by software at the Cloud Data Platform 112 to determine additional actions to be taken, such as logging the presence of the truck 102 at the location where the Bluetooth receiver is located (here, either 108 or 110 or a location assigned to the job site where these are located). The Cloud Data Platform 112 can be running on a remote computer or on a server connected to the internet, for example. Users can access the information at the Cloud Data Platform by addressing a uniform resource locator (URL) on an internet connected computer, smartphone, laptop or tablet located anywhere internet access is available. Users can access the information stored at the Cloud Data Platform using mobile, handheld or battery powered devices and may use the same application or a different application as for the Bluetooth User Device. Users can also use browsers to browse to a login page for the Cloud Data Platform using menus, and may use a user identification field and a password to log in to the Cloud Data Platform or to a web-based user interface page to access the Cloud Data Platform. The Bluetooth receivers 108, 110 communicate with the Cloud Data Platform 112 using networks such as a cellular data networks and servers coupled to and accessible from the internet, for example. Other data networks such as Wi-Fi can be used to communicate between the Bluetooth receiver devices 108, 110. Due to the distance and ranges involved, Bluetooth signaling may not be convenient for communications between the receiver devices 108, 110 and the Cloud Data Platform 112, although a Bluetooth interface can be used as a first leg of a communications path or as part of a communications path in a network. Bluetooth mesh networks described as part of the Bluetooth LE standard can be used. Wired LAN or Ethernet interfaces can be used or can be used in combination with cellular, Wi-Fi or Bluetooth over the air interfaces to communicate between the Bluetooth devices 108, 110 and the Cloud Data Platform 112. In an example, a cellular data signal is used to communicate between devices 108, 110 and Cloud Data Platform 112. Once the cellular signal reaches a cellular base station, wired communications can be used to complete the network.

Figure 2:
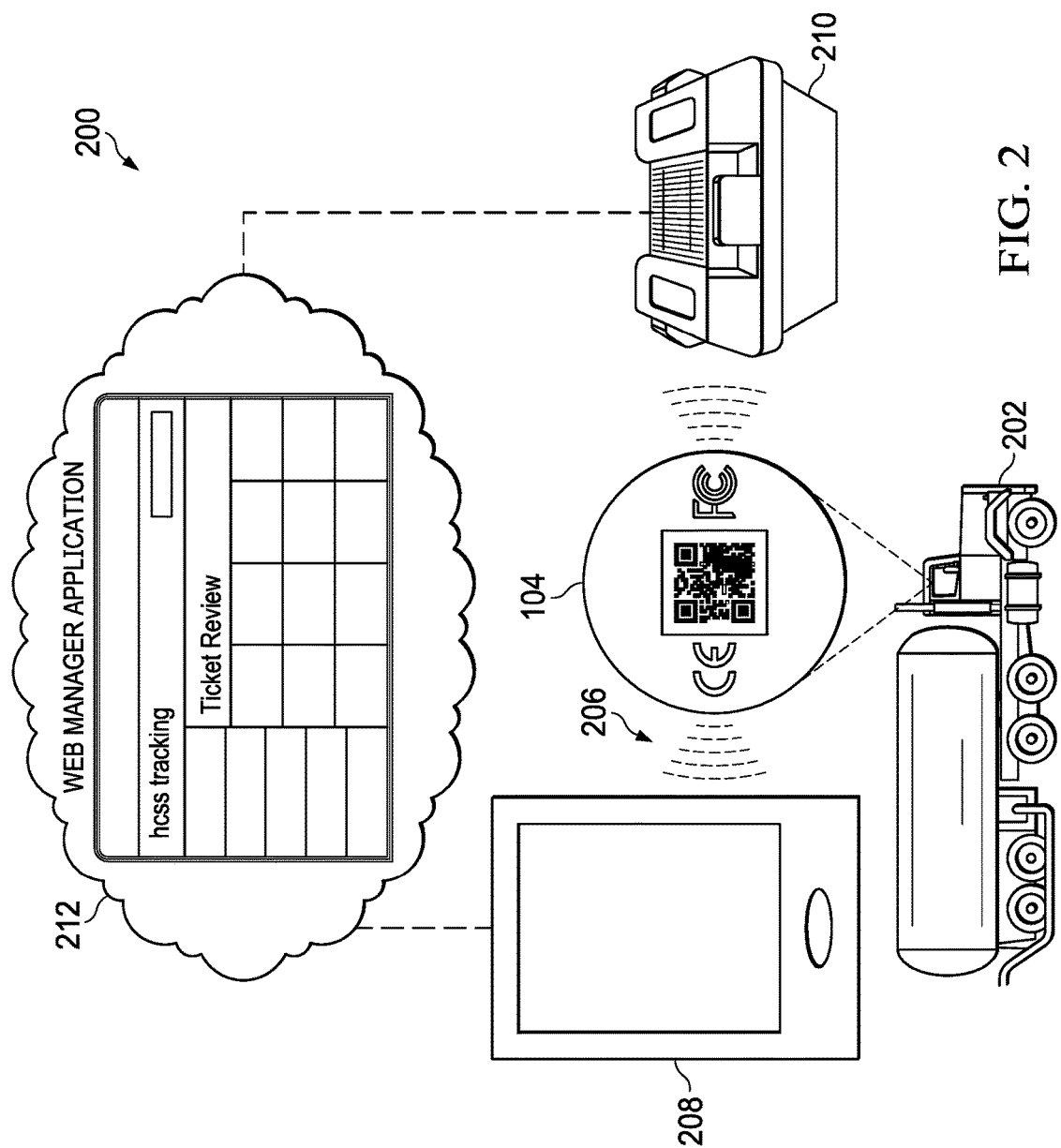
FIG. 2 is a block diagram providing additional details to the block diagram of FIG. 1.

FIG. 2 is a block diagram providing additional details to the block diagram of FIG. 1. In the example system 200 of FIG. 2, similar reference labels are used for elements similar to those shown in FIG. 1, for clarity. For example truck 202 in FIG. 2 corresponds to truck 102 in FIG. 1.

In FIG. 2, a construction vehicle, in this example truck 202, has a Bluetooth beacon 204 installed. In an example use, the Bluetooth beacon 204 is a "dot" or "button" beacon installed on the dash of the truck. The Bluetooth beacon 204 is battery powered and the battery can continue the operation of the beacon for up to several years. A coin type watch battery can be used to power the Bluetooth beacon. Other batteries including rechargeable lithium ion and nickel cadmium batteries can be used. The Bluetooth beacon is very inexpensive, for example a current cost would be less than 5 U.S. Dollars, and thus is disposable. In an alternative example, the beacon 204 can be redeployed to a different construction vehicle for later use. The beacon 204 is configured to transmit a universally unique identification code (UUID). The beacon configuration can be done with a commonly available Bluetooth enabled user device, including certain smartphones. Various user interfaces and apps are available to configure a Bluetooth beacon. In addition, user definable fields for the "major" and "minor" codes can be assigned. In an arrangement, a bar code can be read by a smartphone to associate a beacon with a construction vehicle quickly and without the need for manual entry of codes. In an arrangement the camera on a smartphone can be used to capture the barcode, which can be read by an application. Barcodes can be used to assign the construction vehicle information to the beacon during configuration. In examples, the barcodes can be on the body of the beacon, on the truck, or both. Once the unique identification code is programmed to the Bluetooth beacon, the Bluetooth beacon is activated and will begin transmitting the unique identification code including the UUID and the major and minor fields. Applications for using Bluetooth beacons enable the selection of a power level (transmit range) and selection of the interval for transmitting the unique identification code, which can affect the range where the Bluetooth receiver can detect the beacon signal, and which can also affect battery life of the beacon. For example, a standard setting for an iBeacon will give a reception range of about 70 meters. A 70 meter range is sufficient for most construction site uses, and conveniently, is short enough so that when a Bluetooth receiver detects the Bluetooth signal from the Bluetooth beacon, the approximate location of the construction vehicle is then known to be at the location of the Bluetooth receiver. This characteristic facilitates autonomous tracking of the construction vehicle such as truck 202.

In the example system 200, the user device 208 is shown as a smartphone or tablet. The user device 208 can run an application tailored for the construction vehicle tracking. In one example, when the user device 208 detects a unique identifier from the beacon 204 in truck 202, a user prompt appears on the display of user device 208, asking the user for an input indicating an action to be taken. For example, the user may log the arrival of truck 202 at a particular job site. The user device 208 then signals the unique identification code allocated to the particular truck 202, and the identification information corresponding to the user device 208, to a cloud based service such as a Web Manager Application 212. The communication between the user device 207 and the Web Manager Application 212 can be over a cellular data network (at least in part), a Wi-Fi network, or a combination of these. A Bluetooth communication can be part of the communication link between user device 208 and 212, however due to the range and distance limitations of Bluetooth signaling, a cellular data communication is a convenient interface to use.

In FIG. 2, an alternative Bluetooth receiver is shown as an Unattended Bluetooth Receiver 210. In an example, the Unattended Bluetooth Receiver 210 is a battery powered device that is Bluetooth enabled and which autonomously forwards the unique identifier code received from a beacon in range to the Web Manager Application 212. The Unattended Bluetooth Receiver 210 can include a cellular data interface, Wi-Fi, Bluetooth mesh or other data communications facility. Construction sites often have areas where power is not readily available, so the use of a battery powered receiver such as 212 is convenient. Cellular data interfaces are also convenient at many construction sites where other interfaces are not readily available, such as Wi-Fi or LAN. In an additional example, a solar power panel is included to recharge the battery in the Unattended Bluetooth Receiver 210. This enables long term use of the Unattended Bluetooth Receiver 210 without the need to change or recharge the battery. In yet another alternative, the Unattended Bluetooth Receiver 210 includes an AC power connection or an AC powered battery charger to charge the battery within Unattended Bluetooth Receiver 210.

In an example when Unattended Bluetooth Receiver 210 is used; and a construction vehicle such as truck 202 carrying a beacon 204 arrives in reception range to the Unattended Bluetooth Receiver 210, a message including the unique identifier sent by beacon 204 is received and sent from the Unattended Bluetooth Receiver 210 to the Web Manager Application 212. In this way, the hardware at a construction site, materials depot, or dump site can autonomously track the arrival of the truck 202. No user input is needed, so the site can be unmanned or unattended. This feature is particularly convenient at dump sites where the truck is to leave waste material. In the arrangements, there is no need to man the dump site merely to log the construction vehicles as the trucks arrive on site, the beacons and the Unattended Bluetooth Receiver 210 provide accurate truck log data automatically without the need for personnel. Because the battery in the Unattended Bluetooth Receiver 210 provides a stable source of power and because a solar cell can recharge the device, no personnel are needed to provide logging or support for the autonomous logging at a job site or dump site for extended periods. The use of the Web Manager App 212 enables monitoring of the activity for a variety of construction vehicles at a variety of job sites from any web connected device located anywhere, without the need for personnel at the job sites.

In addition, because each Bluetooth beacon has a Unique Universal Identifier that is constantly transmitted, the Bluetooth receiver in user device 208 or the Unattended Bluetooth Receiver 210 can also determine how many, and which, vehicles are within receiver range and so report how many vehicles are present a job site. By providing real time information about how many vehicles are present, remote personnel can manage which vehicles are directed to a job site and when more vehicles should be directed to the job site, to prevent queueing delays or crowding at a job site. This information can be displayed in the Web Manager App for use by remote personnel monitoring a site, or by use of on-site personnel using a user device 208 with an application, to better schedule additional vehicle or equipment arrivals and to track progress.

Figure 3:
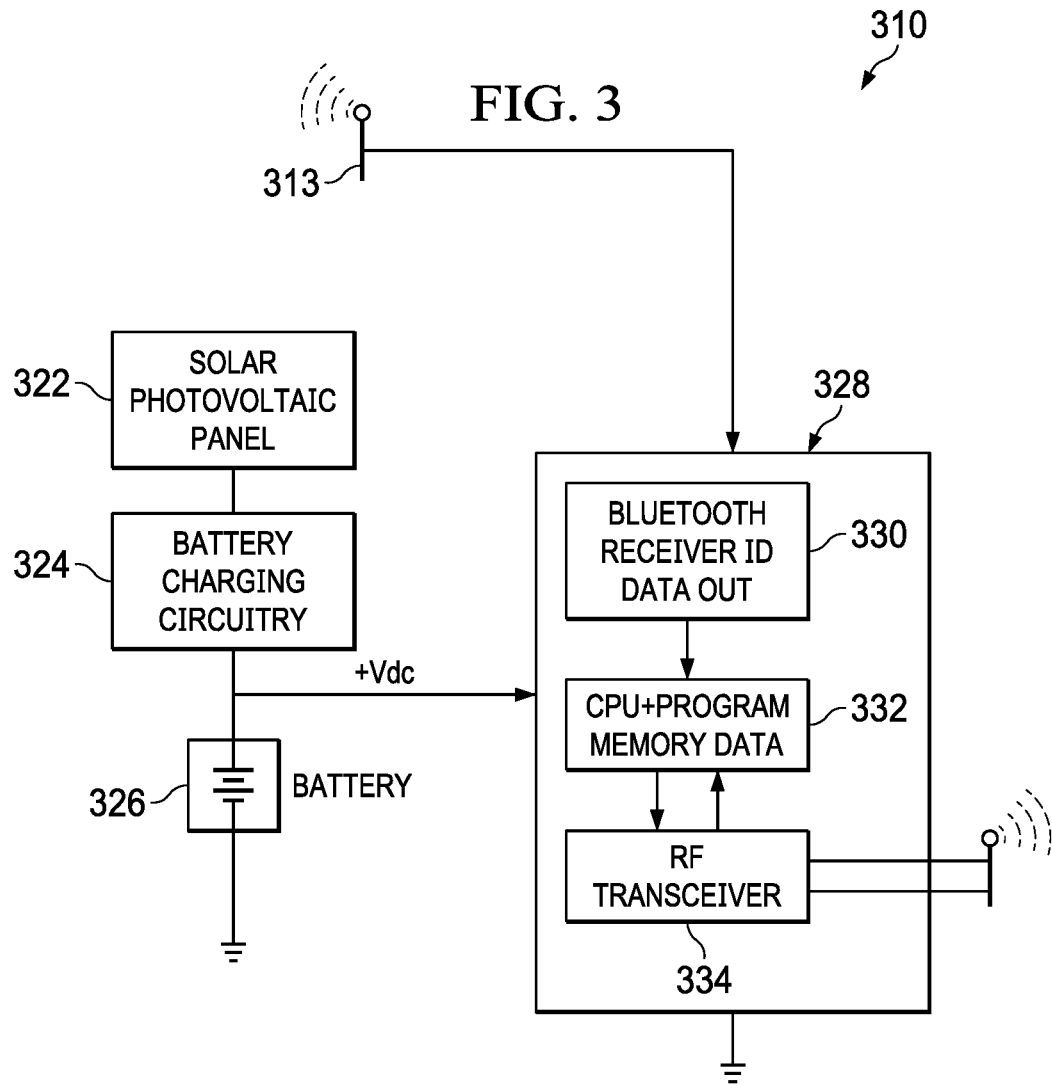
FIG. 3 is a block diagram for an unattended Bluetooth receiver 310 for use with the arrangements.

FIG. 3 is a simplified block diagram for an Unattended Bluetooth Receiver 310 for use with the arrangements. The block diagram shows an example of an implementation for the Unattended Bluetooth Receiver 210 in FIG. 2, but other implementations can also be used. Various modifications and additional hardware can be used with the hardware described herein for block diagram in FIG. 3, these modifications and additions form additional alternative implementations. For example, in an alternative, the battery charging circuitry 324 can be coupled to an AC line input when available.

In FIG. 3, the Unattended Bluetooth Receiver 310 includes an optional Solar Photovoltaic Panel 322, which can also be omitted to form an alternative arrangement. Battery Charging circuit 324 provides charging and recharging current to Battery 326. In an example the Battery 326 can be a deep cycle rechargeable battery such as a 6 Volt or 12 Volt golf cart battery, for example. Other battery types can be used. The Battery Charging circuit 324 can also be connected, in some arrangements, to an AC supply instead of, or in addition to, the Solar Photovoltaic Panel 322.

The block 328 is a simplified diagram for the circuity for the Unattended Bluetooth Receiver 310. A power supply input +Vdc is received from the battery 326. The voltage +Vdc can be 6 Volts, 12 Volts or some other convenient voltage. The circuitry in block 328 includes a Bluetooth receiver 330 coupled to a Bluetooth antenna 313. The Bluetooth receiver can detect the unique identifier code transmitted by a Bluetooth beacon, and provides the unique identifier code on the output labeled "ID Data out."

A programmable processor 332 such as a microcontroller, microprocessor, digital signal processor (DSP), or central processor unit (CPU) including program memory for storing an executable program is included in block 328. The processor 332 can respond to the receiver 330 indicating a new unique identifier code has been detected by executing instructions to forward the unique identifier code. In additional arrangements, the CPU 332 can add predetermined information such as a location identifier, time stamp and date stamp, for transmission to a Cloud Data Platform such as 112 shown in FIG. 1.

A radio frequency transceiver such as a cellular data radio interface transceiver 334 is included in block 328. The transceiver 334 is coupled to an antenna 315. The Unattended Bluetooth Receiver 310 can transmit the unique identifier received from a Bluetooth beacon to a Cloud Data Platform (see 112 in FIG. 1) over a cellular network using antenna 315. The antenna 315 can be shared with the antenna 313, or can be separate antennas as shown.

In an alternative example, Unattended Bluetooth Receivers such as 310 can be installed in equipment that remains on a job site, for example in an excavator or paver, so that the battery of that equipment can be used to provide power, and the cab or operator compartment can provide a secure and sheltered location for the Unattended Bluetooth Receiver. As other vehicles carrying a Bluetooth beacon come into that portion of the job site and in range of the Unattended Bluetooth Receiver, the UUIDs received are forwarded by the antenna to the Cloud Data Platform as described hereinabove with respect to FIG. 3. Using this equipment as a location for the Unattended Bluetooth Receiver adds additional security and protections for the Unattended Bluetooth Receiver without the need for an additional battery or for a solar panel. However, in yet a further alternative, the Unattended Bluetooth Receiver mounted in the heavy equipment can also include a dedicated battery and/or a charging solar panel when mounted in heavy equipment, to reduce the dependency on the battery of the heavy equipment.

Figure 4:
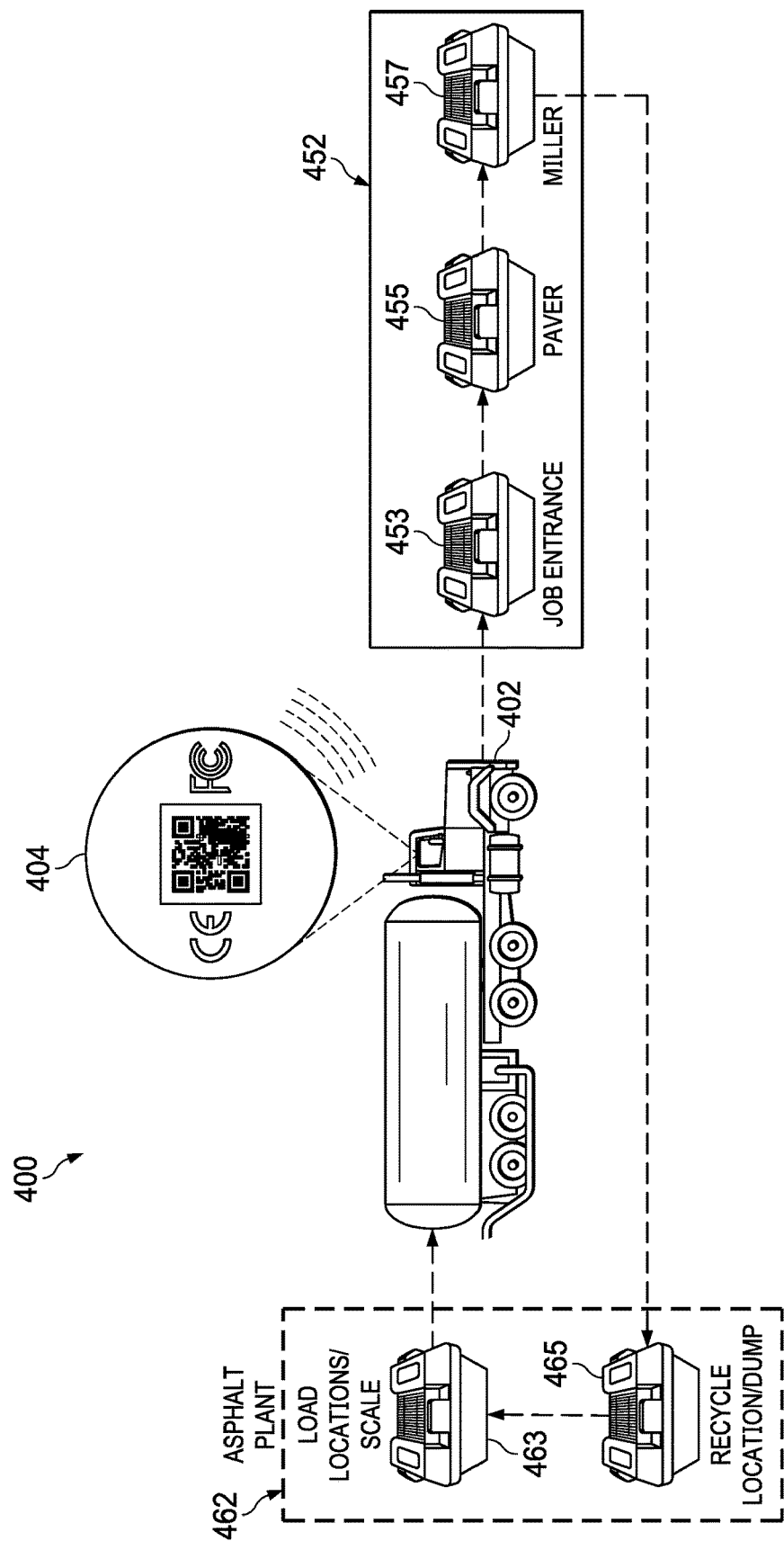
FIG. 4 illustrates an example application of the use of the Unattended Hardware Receivers and Bluetooth beacons to autonomously track a construction vehicle.

FIG. 4 illustrates an example application of the use of the Unattended Hardware Receivers and Bluetooth beacons to autonomously track a construction vehicle (here, a truck 402). In FIG. 4, reference labels for elements similar to those in FIG. 1 are similar, for clarity. For example, Bluetooth beacon 404 corresponds to Bluetooth beacon 204 in FIG. 2.

In FIG. 4, truck 402 including Bluetooth beacon 404 is shown traversing a route (the dashed line) including a jobsite 452 and an Asphalt Plant 462. Within the jobsite 452, several Unattended Bluetooth Receivers 453, 455, and 457 are shown. More (or fewer) Unattended Bluetooth Receivers can be used. The Unattended Bluetooth Receivers include a Bluetooth enabled receiver and a communications interface for communicating data with a remote computer, such as a cellular data transceiver. In FIG. 4, the job entrance is monitored by the Unattended Bluetooth Receiver 453. When the Bluetooth beacon 404 is within range of the Unattended Bluetooth Receiver 453, the Unattended Bluetooth Receiver 453 automatically communicates the presence of the truck 402 to a Web Manager Application (such as 212 shown in FIG. 2) as described hereinabove. As the truck 402 continues into Jobsite 452, a second Unattended Bluetooth Receiver 455 indicates when the truck 402 arrives at a Paver station. A third Unattended Bluetooth Receiver 457 is shown at a Miller station in Jobsite 452. After leaving the jobsite 452, the truck 402 continues to an Asphalt Plant 462. At the Asphalt Plant 462, the truck 402 arrives at an Unattended Bluetooth Receiver 465 at a dump site, which reports the presence of the truck 402 to the Web Manager Application (such as 212 shown in FIG. 2), and as the truck 402 continues to traverse the Asphalt Plant 462, another Unattended Bluetooth Receiver 463 indicates the arrival of the truck 402 at a load location and scale. By use of the Unattended Bluetooth Receivers such as 452, 455, 457, 465 and 463 and the Bluetooth beacon 404, the movement and location of the truck 402 can be autonomously tracked through the workday, and the location data can be automatically logged. The Unattended Bluetooth Receivers will forward the truck identification code and may add additional information to a message transmitted to the remote computer. The data is then instantly available for use by accessing the Web Manager Application (see 212 in FIG. 2). Billing, invoicing and payment can be automated, and the likelihood of inaccurate or erroneous records is eliminated or greatly reduced because the beacons and the Unattended Bluetooth Receivers provide the log data without the need for data entry by personnel.

With respect to the Unattended Bluetooth Receiver 463 at the load location/scale in the Asphalt Plant portion of the jobsite, in an additional arrangement the Unattended Bluetooth Receiver 463 is configured to receive additional data input from a third party equipment such as a scale and to associate the additional data with the UUID received from the Bluetooth beacon in the construction vehicle. The additional data can include weight, time, date, volume or other equipment specific information. The Unattended Bluetooth Receiver 463 can forward the additional information associated with the UUID to the Web Manager Application for use in displaying the information to a user, in automatically generating an invoice for materials loaded, and for tracking progress in moving materials from a site, as examples.

Figure 5:
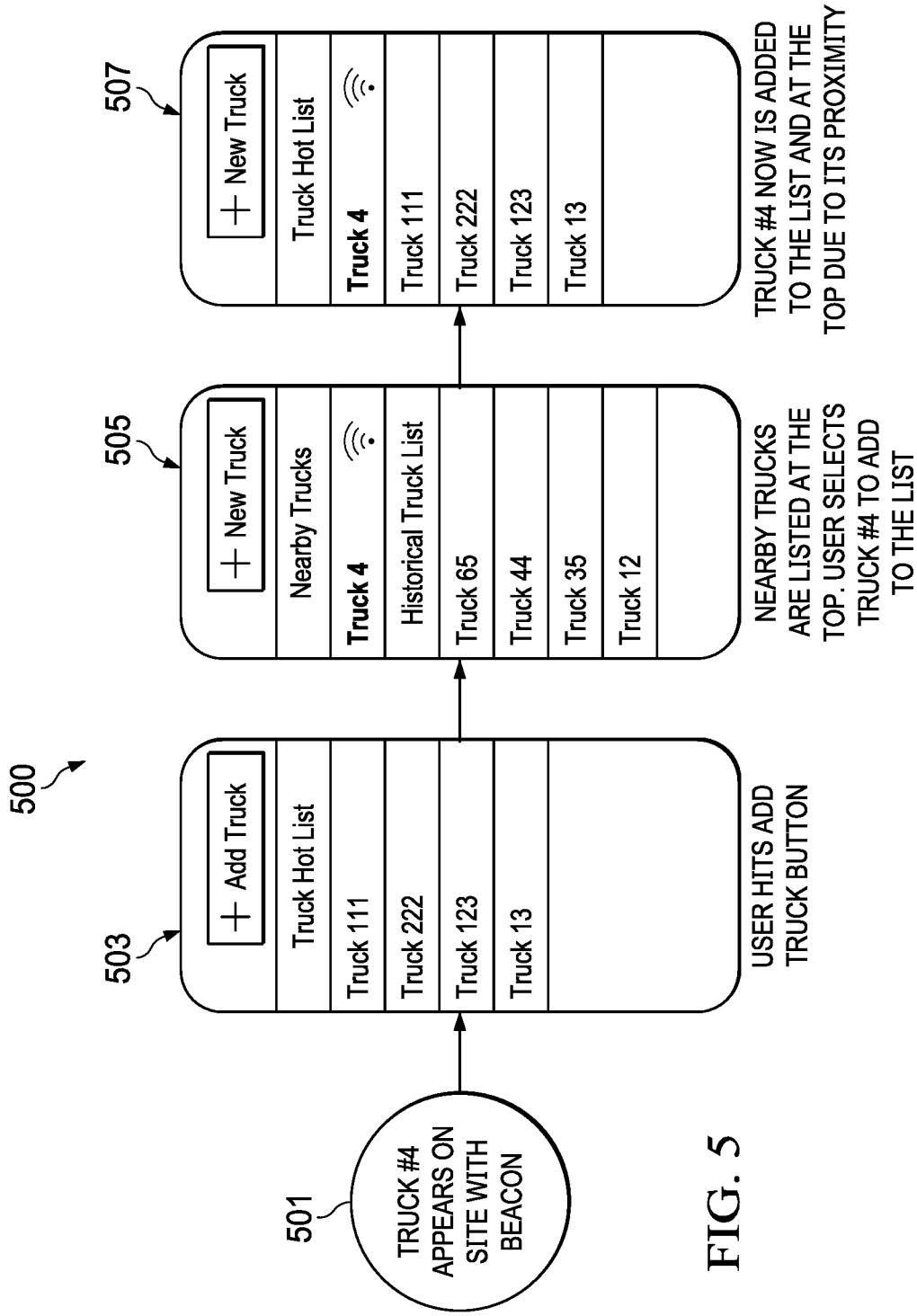
FIG. 5 illustrates a method for use with a user equipment receiving signals for autonomous tracking of a construction vehicle.

FIG. 5 illustrates a user interface for user equipment used for a method arrangement. In FIG. 5, at event 501, a construction vehicle with a beacon arrives at a job site. When the beacon is in range of a user equipment that is at the site, for example a smartphone or tablet with a Bluetooth capable receiver, an application running on the user equipment will alert the user that a beacon is detected. In the example of FIG. 5, the beacon carries a universally unique identifier that is not previously in the list of construction vehicles being tracked. The application therefore prompts the user to ask whether to add this vehicle in event 503 with an example window "Add Truck". At event 505, the user adds the identification code sent by the beacon to the application as "Truck 4." At event 507, a "hot list" shows recently identified construction vehicles that have been received by the user equipment, and Truck 4 is shown in bold and the top of the "hot list" because of the proximity of the beacon to the user equipment. In addition, the user equipment will forward this information to the Web Manager Application (see 212 in FIG. 2) as described hereinabove so that the location of Truck 4 is now available to any user over the web based interfaces as described above.

In the arrangements, a Bluetooth beacon is associated with and placed on a construction vehicle, for example a truck. Conveniently the Bluetooth beacon can be placed on the dashboard of a cab of a tractor trailer, on a visor, in a console or glovebox. Beacons can also be placed on a trailer if desired. The Bluetooth beacon broadcasts a one way Bluetooth radio signal including a unique identifier that can be received by a user equipment (mobile phone, tablet, laptop computer) or by a dedicated hardware receiver that can automatically log that the truck is at a specific location. In an additional aspect, the receiver can alert a user (for example, by use of a mobile app) that a truck is at a site. The user can be prompted to take predetermined actions, such as logging a truck at the site.

Figure 6:
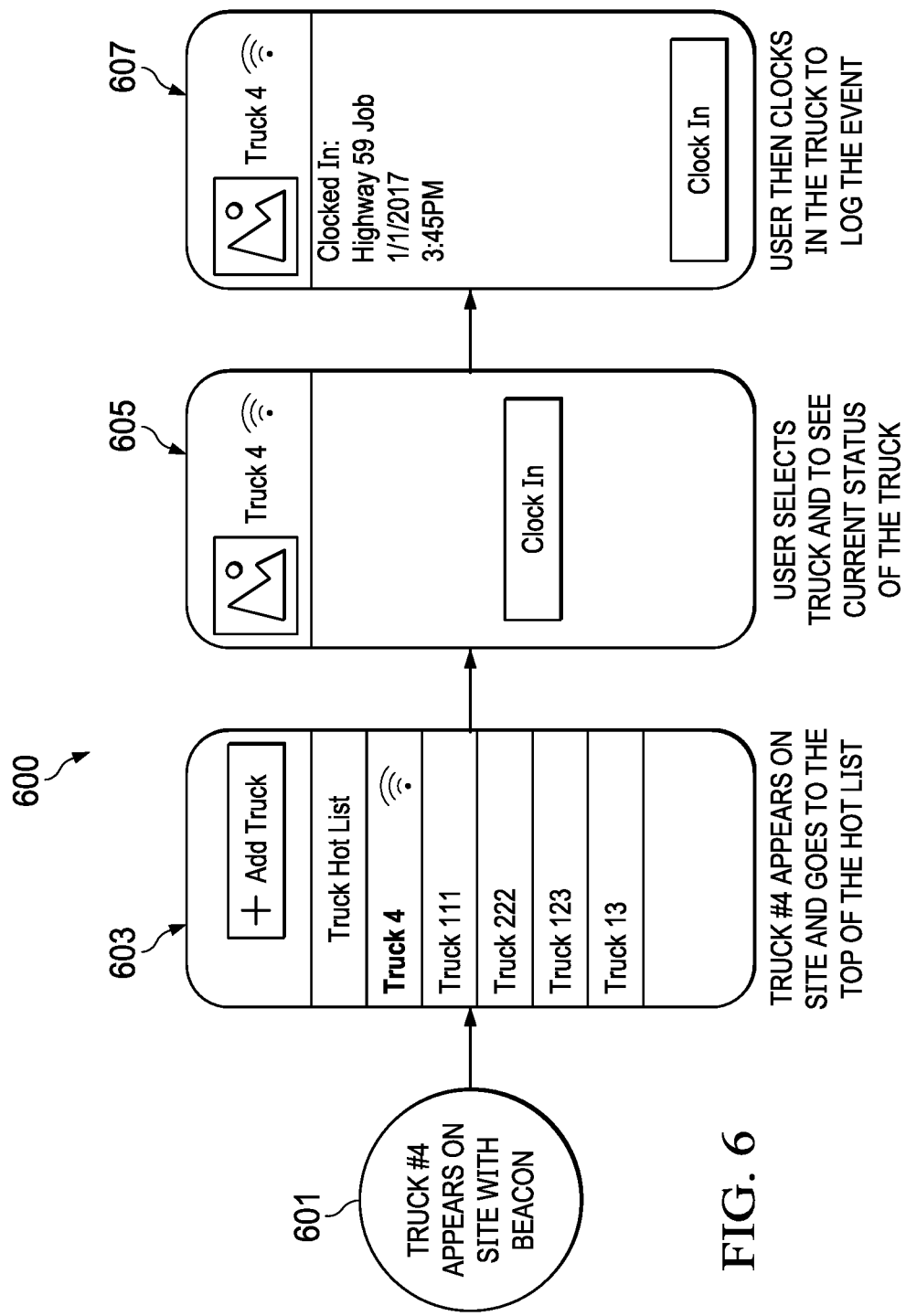
FIG. 6 illustrates another method for use with a user equipment receiving signals for autonomous tracking of the construction vehicle.

FIG. 6 illustrates in another example the use of user equipment at a construction job site and a Bluetooth beacon on a construction vehicle. In FIG. 6, a truck (Truck #4) arrives on a job site with a beacon at event 601. As the beacon on the construction vehicle is in range of a user equipment that is Bluetooth enabled, the presence of Truck #4 is indicated at the top of the "Truck Hot List" displayed to the user. A suggested action "Add Truck" appears on the display at event 603. At event 605, the user selects the line labeled "Truck 4" (shown in bold and at the top of the "Truck Hot List" due to the proximity to the user equipment) and a second screen appears to show the status of the selected construction vehicle (Truck 4) as shown in event 605. In this example, the user selects a suggested action "Clock In." At event 607 the user equipment displays an updated status screen for Truck 4 showing Truck 4 clocked in and located at the job site named "Highway 59 Job" at a date and time. As described hereinabove, the user equipment will also forward this information over a communications network, for example over a cellular data interface, to the Web Manager Application (see FIG. 2 212) for use and visibility to all users that can access the Web Manager Application. The logging including the time stamp, date stamp and location, is performed without the need for data entry; the user equipment application provides the date, time and location, and the beacon provides the construction vehicle identification (Truck 4).

Figure 7:
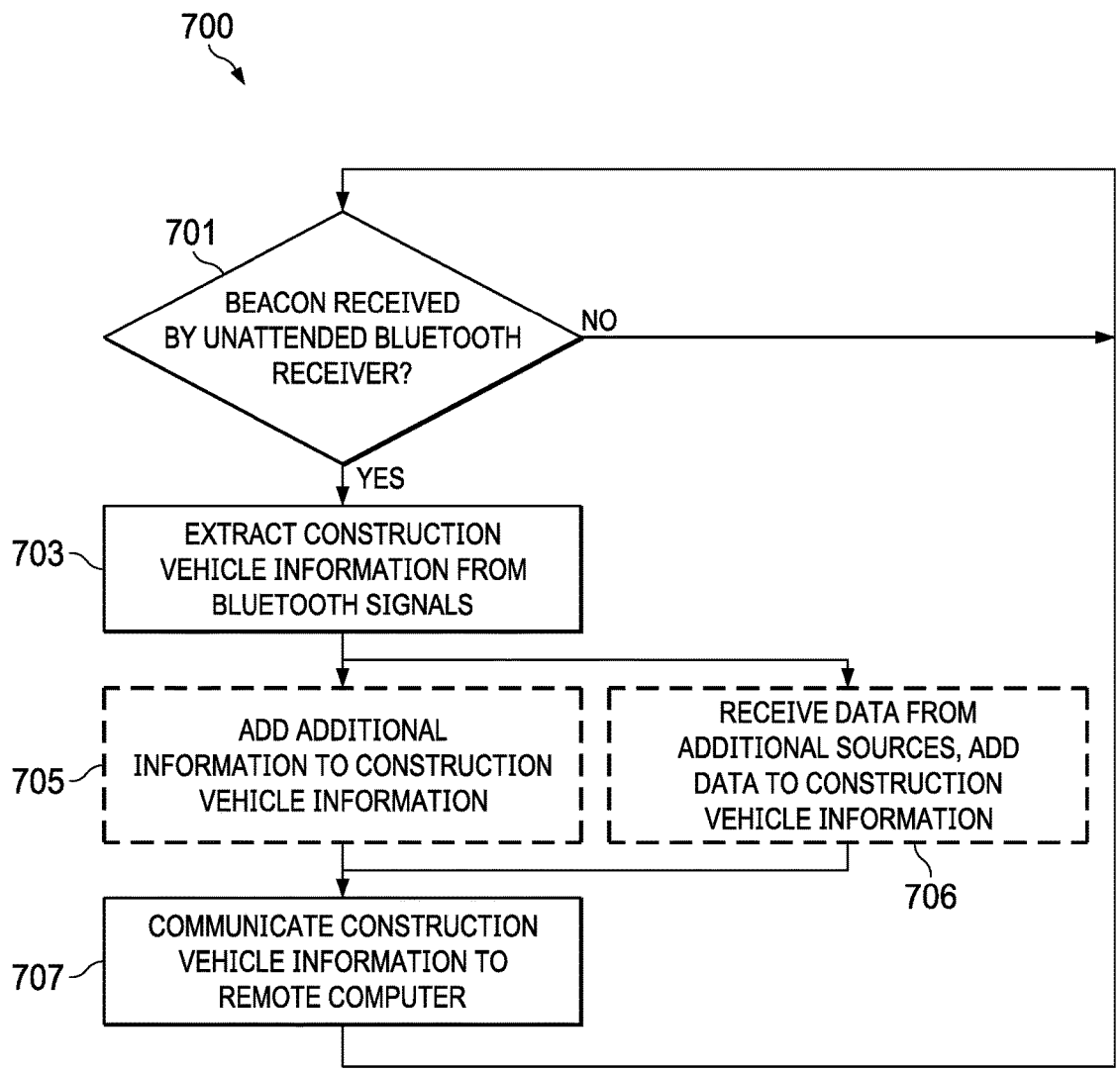
FIG. 7 is a flowchart illustrating a method for an unattended Bluetooth receiver arrangement.

FIG. 7 illustrates in a flowchart 700 a method for operating an Unattended Bluetooth Receiver at a job site. An Unattended Bluetooth Receiver can be used at unmanned job sites, such as a dump site, or at entry, exit and work locations inside a job site. Even if personnel are present, in an example application the use of Unattended Bluetooth Receivers can free personnel from the need to log construction vehicles into and out of the job site; enabling fewer personnel at the job site.

In FIG. 7, method 700 begins at event 701, where a decision loop is operating. The Unattended Bluetooth Receiver will wait until a Bluetooth beacon is within range as indicated by receipt of a Bluetooth beacon signal. If no beacon is in range, the method continues in loop that begins at 701. Once a Bluetooth signal from a beacon is received, as indicated by the "yes" branch from decision block 701, the method 700 transitions to step 703.

At step 703, the Unattended Bluetooth Receiver receives the unique identification (UUID) code from a Bluetooth beacon in a construction vehicle, and the processor in the Unattended Bluetooth Receiver (see the block diagram in FIG. 3, for example, CPU+memory 332 can perform this step).

At step 705, an optional step is shown. In an example, the Unattended Bluetooth Receiver adds information at step 705, for example date stamp, time stamp and location information can be added. Because the Unattended Bluetooth Receiver such as 310 in FIG. 3 includes a programmable processor (see 332 in FIG. 3), additional information can be added to the construction vehicle information by use of a program running on the CPU in the Unattended Bluetooth Receiver. In an alternate example, step 705 can be omitted.

At step 706, an additional optional step is shown. At step 706, the Unattended Bluetooth Receiver receives data from additional sources other than the Bluetooth beacon. An example is a scale. If the Unattended Bluetooth Receiver is associated with a scale, the weight reading can be added to the UUID associated with the construction vehicle carrying the Bluetooth beacon. Alternative information may include other measures such as volume. Material can be added to or removed from the construction vehicle and the amount of material may be a data point provided by additional sources, for example a scale or volumetric pump, to the Unattended Bluetooth Receiver. Step 706 is optional as indicated by the dashed lines.

At step 707, the Unattended Bluetooth Receiver (such as 310 in FIG. 3) communicates the construction vehicle information, and any additional information that is added to the construction vehicle information, to a remote computer using a communications interface such as a cellular data interface as described hereinabove.

After the completion of step 707, the method 700 returns to the decision loop at 701 and awaits additional beacon signals.

In some example, the arrangements use Bluetooth beacons to autonomously track construction vehicles. Bluetooth beacons are less expensive than traditional telematics hardware like GPS, Cellular and other dedicated hardware tracking technologies. The lower cost and ease of administration of the arrangements over these more expensive approaches makes autonomous tracking of construction vehicles, including leased or temporarily used construction vehicles, feasible.

Once the Bluetooth beacons are mounted on a construction vehicle, use of the arrangements enables automatic recognition of the construction vehicle as it comes in proximity to a Bluetooth receiver. The arrangements can completely automate or partly automate the tracking and logging of construction vehicles, tracking of loads, location of equipment, and times for construction vehicles arriving, departing, and on site. This information is accurately collected automatically or by using user interfaces on user equipment, and without the need for data entry or for creating manual logs. Instant or real time access to the construction vehicle information is provided over a web based platform that can store data securely on a remote computer. Remote users can access the construction vehicle information using a web interface. Remote and site based users can access the construction vehicle information using software applications executing on portable user equipment connected to a network.

Modifications are possible in the described examples hereinabove, and other arrangements that form additional aspects are possible, within the scope of the claims.

What is claimed is:

1. A system for tracking a construction vehicle at a construction site, comprising:
   a Bluetooth receiver located at the construction site for receiving a unique identifier code that is autonomously and repeatedly transmitted as a radio frequency signal by a Bluetooth low energy (BLE) transmit only beacon mounted on the construction vehicle, the Bluetooth receiver further configured to communicate the received BLE unique identifier code to a remote computer over a communications interface, the remote computer locating the construction vehicle using a known location of the Bluetooth receiver.

2. The system of claim 1, wherein the Bluetooth receiver is a smartphone.

3. The system of claim 1, wherein the Bluetooth receiver is a tablet.

4. The system of claim 1, wherein the Bluetooth receiver is a laptop.

5. The system of claim 1, wherein the Bluetooth receiver is a battery powered portable device.

6. The system of claim 1, wherein the Bluetooth receiver is a battery powered unmanned receiver device.

7. The system of claim 1, wherein the Bluetooth receiver further comprises:
   a battery coupled to the Bluetooth receiver;
   an antenna for receiving Bluetooth signals;
   a Bluetooth receiver circuit coupled to the antenna and outputting data corresponding to identification codes received at the antenna;
   a processor coupled to the Bluetooth receiver circuit configured to receive the data and to transmit the data over the communications interface; and
   a transmitter coupled to the processor and coupled to a communications antenna different from the antenna to transmit over the communications interface.

8. The system of claim 7, wherein the communications antenna is a cellular data antenna.

9. The system of claim 7, wherein the communications antenna is a Wi-Fi antenna.

10. The system of claim 7, wherein the processor is further configured to add a date stamp and a time stamp to the unique identification code.

11. The system of claim 10, wherein the processor is configured to transmit the data and time stamp and the unique identification code to a computer hosting a web based application.

12. A method, comprising;
   receiving at a Bluetooth enabled user device located in a construction site a unique identification code as a radio frequency signal that is repeatedly and autonomously transmitted from a transmit only Bluetooth low energy (BLE) beacon installed in a construction vehicle by receiving signals over a Bluetooth low energy (BLE) radio frequency communications interface;
   determining whether the received unique identification code corresponds to a known construction vehicle;
   responsive to determining the received unique identification code does not correspond to a known construction vehicle, prompting a user for an input indicating the BLE unique identification code corresponds to a new construction vehicle; and
   responsive to the user input, forwarding the received unique identification code to a remote computer, the remote computer locating the construction vehicle using a location of the Bluetooth receiver.

13. The method of claim 12, and further comprising:
responsive to determining the unique identification code corresponds to a known construction vehicle, displaying to the user a construction vehicle identifier; and
prompting the user to take further actions in response to the determining.

14. The method of claim 13 and further comprising:
prompting the user to log the construction vehicle into a job site.

15. The method of claim 13 and further comprising:
prompting the user to add a date and time stamp to a status record of the construction vehicle.

16. The method of claim 12, wherein forwarding the unique identification code to a remote computer for storage further comprises communicating over a second communications interface different from the Bluetooth communications interface.

17. The method of claim 16, wherein the second communications interface includes a cellular data interface.

18. An apparatus, comprising:
a Bluetooth enabled receiver located in a construction site coupled to an antenna for receiving Bluetooth low energy (BLE) signals that are autonomously and repeatedly transmitted from transmit only Bluetooth low energy beacons placed within construction vehicles;
a programmable processor coupled to the Bluetooth enabled receiver and configured to receive a unique identification code associated with a construction vehicle from a Bluetooth low energy (BLE) signal received by the Bluetooth enabled receiver; and
a transmitter coupled to a communications interface different from the Bluetooth low energy signals;
wherein the programmable processor is further configured to transmit the received unique identification code using the transmitter.

19. The apparatus of claim 18, and further comprising:
a battery coupled to power the Bluetooth enabled receiver, the programmable processor, and the transmitter.

20. The apparatus of claim 19, and further comprising a solar panel coupled to the battery for charging and recharging the battery.

* * * * *